(12) United States Patent
Zhu et al.

(10) Patent No.: US 8,278,011 B2
(45) Date of Patent: *Oct. 2, 2012

(54) NANOSTRUCTURED CATALYST SUPPORTS (75) Inventors: Yimin Zhu, Fremont, CA (US); Jay L. Goldman, Mountain View, CA (US); Baixin Qian, Sunnyvale, CA (US); Ionel C. Stefan, Hayward, CA (US)

(73) Assignee: Nanosys, Inc., Palo Alto, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 12/391,057

(22) Filed: Feb. 23, 2009

(65) Prior Publication Data

US 2012/0021331 A1    Jan. 26, 2012

Related U.S. Application Data

(63) Continuation-in-part of application No. 11/808,760, filed on Jun. 12, 2007, now Pat. No. 7,842,432, which is a continuation-in-part of application No. 11/601,842, filed on Nov. 20, 2006, now Pat. No. 7,939,218, which is a continuation-in-part of application No. 11/295,133, filed on Dec. 6, 2005, now Pat. No. 7,179,561.

(60) Provisional application No. 60/634,472, filed on Dec. 9, 2004, provisional application No. 60/738,100, filed on Nov. 21, 2005, provisional application No. 60/801,377, filed on May 19, 2006.

(51) Int. Cl.
*H01M 4/02* (2006.01)
*H01M 4/36* (2006.01)
*H01M 4/92* (2006.01)
*H01M 4/94* (2006.01)
*C04B 35/52* (2006.01)
*C04B 35/56* (2006.01)
*B01J 27/22* (2006.01)
*B01J 27/224* (2006.01)

(52) U.S. Cl. ........ 429/523; 429/524; 429/525; 429/526; 429/527; 429/528; 502/177; 502/178; 501/88

(58) Field of Classification Search .................. 502/177, 502/178; 429/523–528, 231.5, 245; 501/88; 977/762, 775, 813, 948

See application file for complete search history.

(56) References Cited

U.S. PATENT DOCUMENTS 4,849,311 A    7/1989    Itoh et al.
(Continued)

FOREIGN PATENT DOCUMENTS

EP    1553052    7/2005
(Continued)

OTHER PUBLICATIONS

Bjork, M.T. et al. "One-dimensional Steeplechase for Electron Realized" Nano Lett (2002) 2:86-90.
(Continued)

*Primary Examiner* — Patricia L Hailey
(74) *Attorney, Agent, or Firm* — Andrew L. Filler (57) ABSTRACT

The present invention relates to SiC nanostructures, including SiC nanopowder, SiC nanowires, and composites of SiC nanopowder and nanowires, which can be used as catalyst supports in membrane electrode assemblies and in fuel cells. The present invention also relates to composite catalyst supports comprising nanopowder and one or more inorganic nanowires for a membrane electrode assembly.

15 Claims, 2 Drawing Sheets

U.S. PATENT DOCUMENTS

| | | | |
|---|---|---|---|
| 5,338,430 A | 8/1994 | Parsonage et al. | |
| 5,399,184 A | 3/1995 | Harada | |
| 5,505,928 A | 4/1996 | Alivisatos et al. | |
| 5,635,041 A | 6/1997 | Bahar et al. | |
| 5,677,082 A | 10/1997 | Greinke et al. | |
| 5,690,807 A | 11/1997 | Clark, Jr. et al. | |
| 5,751,018 A | 5/1998 | Alivisatos et al. | |
| 5,879,827 A | 3/1999 | Debe et al. | |
| 5,879,828 A | 3/1999 | Debe et al. | |
| 5,897,945 A | 4/1999 | Lieber et al. | |
| 5,910,378 A | 6/1999 | Debe et al. | |
| 5,916,642 A | 6/1999 | Chang | |
| 5,990,479 A | 11/1999 | Weiss et al. | |
| 5,997,832 A * | 12/1999 | Lieber et al. | 423/249 |
| 6,036,774 A | 3/2000 | Lieber et al. | |
| 6,048,616 A | 4/2000 | Gallagher et al. | |
| 6,136,156 A | 10/2000 | El-Shall et al. | |
| 6,225,198 B1 | 5/2001 | Alivisatos et al. | |
| 6,248,674 B1 | 6/2001 | Kamins et al. | |
| 6,303,266 B1 | 10/2001 | Okino et al. | |
| 6,306,736 B1 | 10/2001 | Alivisatos et al. | |
| 6,361,861 B2 | 3/2002 | Gao et al. | |
| 6,413,489 B1 | 7/2002 | Ying et al. | |
| 6,479,030 B1 | 11/2002 | Firsich | |
| 6,504,292 B1 | 1/2003 | Choi et al. | |
| 6,582,673 B1 | 6/2003 | Chow et al. | |
| 6,589,682 B1 | 7/2003 | Fleckner et al. | |
| 6,610,355 B2 | 8/2003 | Yadav et al. | |
| 6,648,712 B2 | 11/2003 | Choi et al. | |
| 6,741,019 B1 | 5/2004 | Filas et al. | |
| 6,749,827 B2 | 6/2004 | Smalley | |
| 6,749,892 B2 | 6/2004 | Chang | |
| 6,755,956 B2 | 6/2004 | Lee et al. | |
| 6,756,026 B2 | 6/2004 | Colbert et al. | |
| 6,781,166 B2 | 8/2004 | Lieber et al. | |
| 6,809,229 B2 * | 10/2004 | Moy et al. | 585/750 |
| 6,875,537 B2 | 4/2005 | Tani et al. | |
| 6,911,767 B2 | 6/2005 | Takai | |
| 6,926,985 B2 | 8/2005 | Wariishi et al. | |
| 6,933,033 B1 | 8/2005 | Forsyth et al. | |
| 6,949,206 B2 | 9/2005 | Whiteford et al. | |
| 6,962,823 B2 | 11/2005 | Empedocles et al. | |
| 6,976,897 B2 | 12/2005 | Choi et al. | |
| 7,009,331 B2 | 3/2006 | Sheu et al. | |
| 7,105,428 B2 | 9/2006 | Pan et al. | |
| 7,115,971 B2 | 10/2006 | Stumbo et al. | |
| 7,129,554 B2 | 10/2006 | Lieber et al. | |
| 7,132,188 B2 | 11/2006 | Masel et al. | |
| 7,135,728 B2 | 11/2006 | Duan et al. | |
| 7,179,561 B2 * | 2/2007 | Niu et al. | 429/409 |
| 7,189,472 B2 | 3/2007 | Suenaga et al. | |
| 7,351,444 B2 | 4/2008 | Wang et al. | |
| 7,553,371 B2 | 6/2009 | Dubrow et al. | |
| 7,842,432 B2 * | 11/2010 | Niu et al. | 429/512 |
| 7,939,218 B2 * | 5/2011 | Niu | 429/532 |
| 2002/0130311 A1 | 9/2002 | Lieber et al. | |
| 2002/0142202 A1 | 10/2002 | Li et al. | |
| 2002/0172820 A1 | 11/2002 | Majumdar et al. | |
| 2002/0179434 A1 | 12/2002 | Dai et al. | |
| 2003/0008772 A1 | 1/2003 | Ma et al. | |
| 2003/0044608 A1 | 3/2003 | Yoshizawa et al. | |
| 2003/0073573 A1 | 4/2003 | Baker et al. | |
| 2003/0089899 A1 | 5/2003 | Lieber et al. | |
| 2003/0091891 A1 | 5/2003 | Yoshida et al. | |
| 2004/0018416 A1 | 1/2004 | Choi et al. | |
| 2004/0026684 A1 | 2/2004 | Empedocles | |
| 2004/0118698 A1 | 6/2004 | Lu et al. | |
| 2004/0167014 A1 | 8/2004 | Yan et al. | |
| 2004/0197638 A1 * | 10/2004 | McElrath et al. | 429/44 |
| 2004/0202599 A1 | 10/2004 | Xu et al. | |
| 2004/0224217 A1 | 11/2004 | Toops | |
| 2004/0234841 A1 | 11/2004 | Yoshitake et al. | |
| 2005/0053826 A1 | 3/2005 | Wang et al. | |
| 2005/0064185 A1 | 3/2005 | Buretea | |
| 2005/0066883 A1 | 3/2005 | Dubrow et al. | |
| 2005/0112451 A1 | 5/2005 | Lee et al. | |
| 2005/0176264 A1 | 8/2005 | Lai et al. | |
| 2005/0181195 A1 | 8/2005 | Dubrow | |
| 2005/0181209 A1 | 8/2005 | Karandikar | |
| 2005/0221072 A1 | 10/2005 | Dubrow et al. | |
| 2005/0238810 A1 | 10/2005 | Scaringe et al. | |
| 2005/0287418 A1 | 12/2005 | Noh et al. | |
| 2006/0003212 A1 | 1/2006 | Kim et al. | |
| 2006/0008942 A1 | 1/2006 | Romano et al. | |
| 2006/0009003 A1 | 1/2006 | Romano et al. | |
| 2006/0066217 A1 | 3/2006 | Son | |
| 2006/0115711 A1 | 6/2006 | Kim et al. | |
| 2006/0116284 A1 | 6/2006 | Pak et al. | |
| 2006/0159916 A1 | 7/2006 | Dubrow et al. | |
| 2007/0026293 A1 | 2/2007 | Kim et al. | |
| 2007/0190880 A1 | 8/2007 | Dubrow et al. | |
| 2007/0212538 A1 * | 9/2007 | Niu | 428/367 |
| 2010/0297502 A1 * | 11/2010 | Zhu et al. | 429/231.8 |

FOREIGN PATENT DOCUMENTS

| | | | |
|---|---|---|---|
| JP | 59-127372 | | 7/1984 |
| JP | 64-014873 | | 1/1989 |
| JP | 1994203840 | | 7/1994 |
| JP | 1996-17440 | | 1/1996 |
| JP | 2003353528 | | 12/2000 |
| JP | 2003-282097 A | | 10/2003 |
| JP | 2005-193182 A | | 7/2005 |
| JP | 2006131499 | | 5/2006 |
| WO | 02080280 | | 10/2002 |
| WO | 2004099068 | | 11/2004 |
| WO | 2005069955 | | 8/2005 |
| WO | 2005075048 | | 8/2005 |
| WO | 2007001343 | | 1/2007 |
| WO | 2010/096035 | * | 8/2010 |

OTHER PUBLICATIONS

Cao, Y.W. et al. "Growth and Properties of Semiconductor Core/Shell Nanocrystals with InAs Cores" J. Am. Chem. Soc. (2000) 122:9692-9702.

Choi, W.C. et al., "Bimetallic Pt—Ru nanowire network for anode material in a direct-methanol fuel cell" J. Power Sources (2003) 124(2):420-425.

Cui, Y. et al. "Doping and electrical transport in silicon wires" J. Phys. Chem. B. (2000) 104:5213-5216.

Cui, Y. et al. "Diameter-controlled synthesis of single-crystal silicon nanowires" Appl. Phys. Lett (2001) 78 (15):2214-2216.

Dabbousi et al., "(CdSe)ZnS core-shell quantum dots: Synthesis and characterization of a size series of highly luminescent nanocrystallites" J. Phys. Chem. B (1997) 101:9463-9475.

Duan, X. et al. "General synthesis of compound semiconductor nanowires" Adv. Mater. (2000) 12:298-302.

Duan, X. et al. "High-performance thin-film transistors using semiconductor nanowires and nanoribbons" Nature (2003) 425:274-278.

Greene, L. et al., "Low-temperature wafer scale production of ZnO nanowire arrays" Angew. Chem. Int. Ed. (2003) 42:3031-3034.

Gudicksen, M.S. et al. "Diameter-selective synthesis of semiconductor nanowires" J. Am. Chem. Soc. (2000) 122:8801-8802.

Gudicksen, M.S. et al. "Synthetic control of the diameter and length of single crystal semiconductor nanowires" J. Phys. Chem. (2001) 105:4062-4064.

Gudicksen, M.S. et al. "Growth of nanowire superlatiice structures of nanoscale photonics and electronics" Nature (2002) 415:617-620.

Jun, Y-W, et al. "Controlled synthesis of multi-armed CdS nanorod architectures using monosurfactant system" J. Am. Chem. Soc. (2001) 123:5150-5151.

Liu, C. et al. "Sol-Gel Synthesis of Free-Standing Ferroelectric Lead Zirconate Titanate Nanoparticles" J. Am. Chem. Soc. (2001) 123:4344 4345.

Manna, L. et al. "Synthesis of soluble and processable rod-, arrow-, teardrop-, and tetrapod-shaped CdSe nanocrystals" J. Am. Chem. Soc. (2000) 122:12700-12706.

Manna et al., "Epitaxial growth and photochemical annealing of graded CdS/ZnS shells on colloidal CdSe nanorods" J. Am. Chem. Soc. (2002) 124:7136-7145.

Morales, A.M. et al., "A laser ablation method for the synthesis of crystalline semiconductor nanowires" Science (1998) 279:208-211.

Peng, X. et al. "Epitaxial growth of highly luminescent CdSe/CdS core/shell nanocrystals with photostability and electronic accessibility" J. Am. Chem. Soc. (1997) 119:7019-7029.

Peng, X. et al. "Shape control of CdSe nanocrystals" Nature (2000) 404:59-61.

Puntes, V.F. et al. "Colloidal nanocrystal shape and size control: The case of cobalt" Science (2001) 291:2115-2117.

Urban, J.J. et al. "Synthesis of single-crystalline perovskite nanowires composed of brium titanate and strontium titanate" J. Am. Chem. Soc. (2002) 124:1186-1187.

Wu, Y. et al. "Block-by-block growth of single-crystalline Si/SiGe superlattice nanowires" Nano Lett (2002) 2:83-86.

Yun, W.S. et al. "Ferroelectric properties of individual barium titanate nanowires investigated by scanned probe microscopy" Nano Lett (2002) 2(5):447-450.

Yang, W. et al. "Fabrication in-situ SiC nanowires/SiC matrix composite by chemical vapour infiltration process" Mat. Lett (2004) 58(25):3145-3148.

Supplemental EP Search Report in related European Patent Application No. EP06838053 dated Apr. 22, 2010.

* cited by examiner

NANOSTRUCTURED CATALYST SUPPORTS

CROSS REFERENCE TO RELATED APPLICATIONS

The present application is a continuation-in-part of U.S. patent application Ser. No. 11/808,760, filed Jun. 12, 2007, which is a continuation-in-part of U.S. patent application Ser. No. 11/601,842, filed Nov. 20, 2006, which is a continuation-in-part of U.S. patent application Ser. No. 11/295,133, filed Dec. 6, 2005, now U.S. Pat. No. 7,179,561, which claims the benefit of U.S. Provisional Patent Application Nos. 60/634,472, filed Dec. 9, 2004, and 60/738,100, filed Nov. 21, 2005. U.S. application Ser. No. 11/601,842, also claims the benefit of U.S. Provisional Patent Application Nos. 60/801,377, filed May 19, 2006, and 60/738,100, filed Nov. 21, 2005. The disclosures of each of these applications are incorporated herein by reference in their entireties.

STATEMENT REGARDING FEDERALLY SPONSORED RESEARCH

Portions of this invention may have been made pursuant to a contract with the United States Government, Department of Energy, Hydrogen, Fuel Cells & Infrastructure Technologies Program Contract Number DE-FG36-08G088097, entitled "Engineered Nanostructure MEA Technology for Low Temperature Fuel Cells." As such, the United States Government may have certain rights in this invention.

BACKGROUND OF THE INVENTION

1. Field of the Invention

The present invention relates to SiC nanostructures, including SiC nanopowder, SiC nanowires, and composites of SiC nanopowder and nanowires, which can be used as catalyst supports in membrane electrode assemblies and in fuel cells. The present invention also relates to composite catalyst supports comprising nanopowder and one or more inorganic nanowires for a membrane electrode assembly.

2. Background of the Invention

Fuel cells are devices that convert the chemical energy of fuels, such as hydrogen and methanol, directly into electrical energy. The basic physical structure or building block of a fuel cell consists of an electrolyte layer in contact with a porous anode and cathode on either side. In a typical fuel cell, a fuel (e.g., methanol or hydrogen) is fed to an anode catalyst that converts the fuel molecules into protons (and carbon dioxide for methanol fuel cells), which pass through the proton exchange membrane to the cathode side of the cell. At the cathode catalyst, the protons (e.g., hydrogen atoms without an electron) react with the oxygen ions to form water. By connecting a conductive wire from the anode to the cathode side, the electrons stripped from fuel, hydrogen or methanol on the anode side, can travel to the cathode side and combine with oxygen to form oxygen ions, thus producing electricity. Fuel cells operating by electrochemical oxidation of hydrogen or methanol fuels at the anode and reduction of oxygen at the cathode are attractive power sources because of their high conversion efficiencies, low pollution, lightweight design, and high energy density.

In direct methanol fuel cells (DMFCs), the liquid methanol (CH$_3$OH) is oxidized in the presence of water at the anode generating CO$_2$, hydrogen ions and the electrons that travel through the external circuit as the electric output of the fuel cell. The hydrogen ions travel through the electrolyte and react with oxygen from the air and the electrons from the external circuit to form water at the anode completing the circuit.

Anode Reaction: CH$_3$OH+H$_2$O→CO$_2$+6H++6e−

Cathode Reaction: 3/2O$_2$+6H++6e−→3H$_2$O

Overall Cell Reaction: CH$_3$OH+3/2O$_2$→CO$_2$+2H$_2$O

Initially developed in the early 1990s, DMFCs were not embraced because of their low efficiency and power density, as well as other problems. Improvements in catalysts and other recent developments have increased power density 20-fold and the efficiency may eventually reach 40%. These cells have been tested in a temperature range from about 50° C.-120° C. This low operating temperature and no requirement for a fuel reformer make the DMFC an excellent candidate for very small to mid-sized applications, such as cellular phones, laptops, cameras and other consumer products, up to automobile power plants. One of the drawbacks of the DMFC is that the low-temperature oxidation of methanol to hydrogen ions and carbon dioxide requires a more active catalyst, which typically means a larger quantity of expensive platinum (and/or ruthenium) catalyst is required.

A DMFC typically requires the use of ruthenium (Ru) as a catalyst component because of its high carbon monoxide (CO) tolerance and reactivity. Ru disassociates water to create an oxygenated species that facilitates the oxygenation of CO, which is produced from the methanol, to CO$_2$. Some existing DMFCs use nanometer-sized bimetallic Pt:Ru particles as the electro-oxidation catalyst because of the high surface area to volume ratio of the particles. The Pt/Ru nanoparticles are typically provided on a carbon support (e.g., carbon black, fullerene soot, or desulfurized carbon black) to yield a packed particle composite catalyst structure. Most commonly used techniques for creating the Pt:Ru carbon packed particle composite are the impregnation of a carbon support in a solution containing platinum and ruthenium chlorides followed by thermal reduction.

A multi-phase interface or contact is established among the fuel cell reactants, electrolyte, active Pt:Ru nanoparticles, and carbon support in the region of the porous electrode. The nature of this interface plays a critical role in the electrochemical performance of the fuel cell. Often, only a portion of catalyst particle sites in packed particle composites are utilized because other sites are either not accessible to the reactants, or not connected to the carbon support network (electron path) and/or electrolyte (proton path). Thus, there is a need for improved catalyst supports for use in fuel cells.

SUMMARY OF THE INVENTION

In one embodiment, the present invention provides catalyst supports for a membrane electrode assembly of a fuel cell. Suitably, the catalyst supports comprise one or more SiC nanostructures, wherein the SiC nanostructures have at least one metal catalyst deposited thereon. Exemplary SiC nanostructures include SiC nanowires and SiC nanopowder. In embodiments, the catalyst supports comprise SiC nanopowder and nanowires, such as RuO$_2$, SiC, GaN, TiO$_2$, SnO$_2$, WC$_x$, MoC$_x$, ZrC, WN$_x$, or MoN$_x$ nanowires. In suitable embodiments, the SiC nanopowder is cross-linked by graphene sheets.

In further embodiments, the present invention provides composite catalyst supports for a membrane electrode assembly of a fuel cell. Suitably, the catalyst supports comprise nanopowder and one or more inorganic nanowires, wherein at least one of the nanopowder and the nanowire have at least one metal catalyst disposed thereon. Suitably the nanopowder comprises WC, $SiO_2$, $TiO_2$ or combinations thereof.

Exemplary catalyst metals for use in the practice of the present invention include one or more of Pt, Au, Pd, Ru, Re, Rh, Os, Ir, Fe, Co, Ni, Cu, Ag, V, Cr, Mo, W and alloys or mixtures thereof. Suitably, the catalyst metal comprises nanoparticles having a diameter less than about 10 nm or less than about 5 nm, such as nanoparticles comprising Pt:Ru. Inorganic nanowires for use in the practice of the present invention include, but are not limited to, $RuO_2$, SiC, GaN, $TiO_2$, $SnO_2$, $WC_x$, $MoC_x$, ZrC, $WN_x$, and $MoN_x$, nanowires.

In exemplary embodiments, the catalyst supports further comprise a proton conducting polymer in contact with the nanostructures (nanopowder and/or nanowires). Suitably, the membrane electrode assembly is a component in a hydrogen fuel cell or direct methanol fuel cell (DMFC).

The present invention also provides membrane electrode assemblies comprising the various catalyst supports described herein.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

It should be appreciated that the particular implementations shown and described herein are examples of the invention and are not intended to otherwise limit the scope of the present invention in any way. Indeed, for the sake of brevity, conventional electronics, manufacturing, semiconductor devices, and nanowire (NW), nanorod, nanotube, and nanoribbon technologies and other functional aspects of the systems (and components of the individual operating components of the systems) may not be described in detail herein. Furthermore, for purposes of brevity, the invention is frequently described herein as pertaining to nanowires, though other similar structures are also encompassed herein.

It should be appreciated that although nanowires are frequently referred to, the techniques described herein are also applicable to other nanostructures, such as nanorods, nanopowder, nanotubes, nanotetrapods, nanoribbons and/or combinations thereof. It should further be appreciated that a carbon-based layer (including non-crystalline carbon, such as non-basal plane carbon, as well as crystalline nanographite coatings) can be produced on the surface of a wide range of materials, including, but not limited to, conventional fibers and fiber structures; flat, curved and irregular surfaces; and various materials such as metal, semiconductors, ceramic foams, reticulated metals and ceramics.

As used herein, an "aspect ratio" is the length of a first axis of a nanostructure divided by the average of the lengths of the second and third axes of the nanostructure, where the second and third axes are the two axes whose lengths are most nearly equal to each other. For example, the aspect ratio for a perfect rod would be the length of its long axis divided by the diameter of a cross-section perpendicular to (normal to) the long axis.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In another embodiment, the nanostructure comprises a core of a first material and at least one shell of a second (or third etc.) material, where the different material types are distributed radially about the long axis of a nanowire, a long axis of an arm of a branched nanocrystal, or the center of a nanocrystal, for example. A shell need not completely cover the adjacent materials to be considered a shell or for the nanostructure to be considered a heterostructure. For example, a nanocrystal characterized by a core of one material covered with small islands of a second material is a heterostructure. In other embodiments, the different material types are distributed at different locations within the nanostructure. For example, material types can be distributed along the major (long) axis of a nanowire or along a long axis or arm of a branched nanocrystal. Different regions within a heterostructure can comprise entirely different materials, or the different regions can comprise a base material.

As used herein, a "nanostructure" is a structure having at least one region or characteristic dimension with a dimension of less than about 500 nm, e.g., less than about 200 nm, less than about 100 nm, less than about 50 nm, or even less than about 20 nm. Typically, the region or characteristic dimension will be along the smallest axis of the structure. Examples of such structures include nanowires, nanopowder, nanorods, nanotubes, branched nanocrystals, nanotetrapods, tripods, bipods, nanocrystals, nanodots, quantum dots, nanoparticles, branched tetrapods (e.g., inorganic dendrimers), and the like. Nanostructures can be substantially homogeneous in material properties, or in other embodiments can be heterogeneous (e.g., heterostructures). Nanostructures can be, for example, substantially crystalline, substantially monocrystalline, polycrystalline, amorphous, or combinations thereof. In one aspect, one of the three dimensions of the nanostructure has a dimension of less than about 500 nm, for example, less than about 200 nm, less than about 100 nm, less than about 50 nm, or even less than about 20 nm.

As use herein, the term "nanopowder" generally refers to any solid, separated material with individual particles having sizes under 500 nm, and suitably, less than 100 nm. Suitably, the nanopowders of the present invention comprise conductive or semiconductive material (or other material described herein). The nanopowders can be substantially homogeneous in composition, or can be heterogeneous (i.e., the nanopowders can comprise various particles of different chemical composition and/or material properties).

As used herein, the term "nanowire" generally refers to any elongated conductive or semiconductive material (or other material described herein) that includes at least one cross sectional dimension that is less than 500 nm, and suitably, less than 100 nm, and has an aspect ratio (length:width) of greater than 10, preferably greater than 50, and more preferably, greater than 100.

The nanowires of this invention can be substantially homogeneous in material properties, or in other embodiments can be heterogeneous (e.g. nanowire heterostructures). The nanowires can be fabricated from essentially any convenient material or materials, and can be, e.g., substantially crystalline, substantially monocrystalline, polycrystalline, amorphous, or combinations thereof. Nanowires can have a variable diameter or can have a substantially uniform diameter, that is, a diameter that shows a variance less than about 20% (e.g., less than about 10%, less than about 5%, or less than about 1%) over the region of greatest variability and over a linear dimension of at least 5 nm (e.g., at least 10 nm, at least 20 nm, or at least 50 nm). Typically the diameter is evaluated away from the ends of the nanowire (e.g., over the central 20%, 40%, 50%, or 80% of the nanowire). A nanowire can be straight or can be e.g., curved or bent, over the entire length of its long axis or a portion thereof. In other embodiments, a nanowire or a portion thereof can exhibit two- or three-dimensional quantum confinement.

Examples of such nanowires include semiconductor nanowires as described in Published International Patent Application Nos. WO 02/017362, WO 02/048701, and WO 01/003208, carbon nanotubes, and other elongated conductive or semiconductive structures of like dimensions, which are incorporated herein by reference.

As used herein, the term "nanorod" generally refers to any elongated conductive or semiconductive material (or other material described herein) similar to a nanowire, but having an aspect ratio (length:width) less than that of a nanowire. Note that two or more nanorods can be coupled together along their longitudinal axis so that the coupled nanorods span all the way between electrodes. Alternatively, two or more nanorods can be substantially aligned along their longitudinal axis, but not coupled together, such that a small gap exists between the ends of the two or more nanorods. In this case, electrons can flow from one nanorod to another by hopping from one nanorod to another to traverse the small gap. The two or more nanorods can be substantially aligned, such that they form a path by which electrons can travel between electrodes.

A wide range of types of materials for nanowires, nanopowders, nanorods, nanotubes and nanoribbons can be used, including semiconductor material selected from, e.g., Si, Ge, Sn, Se, Te, B, C (including diamond), P, BC, BP($BP_6$), BSi, SiC, SiGe, SiSn, GeSn, WC, $SiO_2$, $TiO_2$, BN, BAs, AlN, AlP, AlAs, AlSb, GaN, GaP, GaAs, GaSb, InN, InP, InAs, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, AgF, AgCl, AgBr, AgI, $BeSiN_2$, $CaCN_2$, $ZnGeP_2$, $CdSnAs_2$, $ZnSnSb_2$, $CuGeP_3$, $CuSi_2P_3$, (Cu, Ag)(Al, Ga, In, Tl, Fe)(S, Se, Te)$_2$, $Si_3N_4$, $Ge_3N_4$, $Al_2O_3$, (Al, Ga, In)$_2$ (S, Se, Te)$_3$, $Al_2CO$, and an appropriate combination of two or more such semiconductors.

The nanopowders and nanowires of the present invention can also be formed from other materials such as metals such as gold, nickel, palladium, iradium, cobalt, chromium, aluminum, titanium, tin and the like, metal alloys, polymers, conductive polymers, ceramics, and/or combinations thereof. Other now known or later developed conducting or semiconductor materials can be employed.

Nanowires of the present invention may also comprise organic polymers, ceramics, inorganic semiconductors such as carbides and nitrides, and oxides (such as $TiO_2$ or ZnO), carbon nanotubes, biologically derived compounds, e.g., fibrillar proteins, etc. or the like. For example, in certain embodiments, inorganic nanowires are employed, such as semiconductor nanowires. Semiconductor nanowires can be comprised of a number of Group IV, Group III-V or Group II-VI semiconductors or their oxides. In one embodiment, the nanowires may include metallic conducting, semiconducting, carbide, nitride, or oxide materials such as $RuO_2$, SiC, GaN, $TiO_2$, $SnO_2$, $WC_x$, $MoC_x$, ZrC, $WN_x$, $MoN_x$ etc. As used throughout, the subscript "x," when used in chemical formulae, refers to a whole, positive integer (e.g., 1, 2, 3, 4, 5, 6, 7, 8, 9, 10, etc). It is suitable that the nanowires be made from a material that is resistant to degradation in a weak acid so that the nanowires are compatible with the reactants of a variety of different fuel cells. Nanowires according to this invention can include, or can expressly exclude, carbon nanotubes, and, in certain embodiments, exclude "whiskers" or "nanowhiskers", particularly whiskers having a diameter greater than 100 nm, or greater than about 200 nm.

In other aspects, the semiconductor may comprise a dopant from a group consisting of: a p-type dopant from Group III of the periodic table; an n-type dopant from Group V of the periodic table; a p-type dopant selected from a group consisting of: B, Al and In; an n-type dopant selected from a group consisting of: P, As and Sb; a p-type dopant from Group II of the periodic table; a p-type dopant selected from a group consisting of: Mg, Zn, Cd and Hg; a p-type dopant from Group IV of the periodic table; a p-type dopant selected from a group consisting of: C and Si; or an n-type dopant selected from a group consisting of: Si, Ge, Sn, S, Se and Te. Other now known or later developed dopant materials can be employed.

Additionally, the nanowires or nanoribbons can include carbon nanotubes, or nanotubes formed of conductive or semiconductive organic polymer materials, (e.g., pentacene, and transition metal oxides).

It should be understood that the spatial descriptions (e.g., "above", "below", "up", "down", "top", "bottom", etc.) made herein are for purposes of illustration only, and that devices of the present invention can be spatially arranged in any orientation or manner.

Nanomaterials have been produced in a wide variety of different ways. For example, solution based, surfactant mediated crystal growth has been described for producing spherical inorganic nanomaterials, e.g., quantum dots, as well as elongated nanomaterials, e.g., nanorods and nanotetrapods. Other methods have also been employed to produce nanomaterials, including vapor phase methods. For example, silicon nanocrystals have been reportedly produced by laser pyrolysis of silane gas.

Other methods employ substrate based synthesis methods including, e.g., low temperature synthesis methods for producing, e.g., ZnO nanowires as described by Greene et al. ("Low-temperature wafer scale production of ZnO nanowire arrays," L. Greene, M. Law, J. Goldberger, F. Kim, J. Johnson, Y. Zhang, R. Saykally, P. Yang, Angew. *Chem. Int. Ed.* 42, 3031-3034, 2003), and higher temperature VLS methods that employ catalytic gold particles, e.g., that are deposited either as a colloid or as a thin film that forms a particle upon heating. Such VLS methods of producing nanowires are described in, for example, Published International Patent Application No. WO 02/017362, the full disclosure of which is incorporated herein by reference in its entirety for all purposes.

Nanostructures can be fabricated and their size can be controlled by any of a number of convenient methods that can be adapted to different materials. For example, synthesis of nanocrystals of various composition is described in, e.g., Peng et al. (2000) "Shape Control of CdSe Nanocrystals" *Nature* 404, 59-61; Puntes et al. (2001) "Colloidal nanocrystal shape and size control: The case of cobalt" *Science* 291, 2115-2117; U.S. Pat. No. 6,306,736 to Alivisatos et al. (Oct.

23, 2001) entitled "Process for forming shaped group III-V semiconductor nanocrystals, and product formed using process;" U.S. Pat. No. 6,225,198 to Alivisatos et al. (May 1, 2001) entitled "Process for forming shaped group II-VI semiconductor nanocrystals, and product formed using process;" U.S. Pat. No. 5,505,928 to Alivisatos et al. (Apr. 9, 1996) entitled "Preparation of III-V semiconductor nanocrystals;" U.S. Pat. No. 5,751,018 to Alivisatos et al. (May 12, 1998) entitled "Semiconductor nanocrystals covalently bound to solid inorganic surfaces using self-assembled monolayers;" U.S. Pat. No. 6,048,616 to Gallagher et al. (Apr. 11, 2000) entitled "Encapsulated quantum sized doped semiconductor particles and method of manufacturing same;" and U.S. Pat. No. 5,990,479 to Weiss et al. (Nov. 23, 1999) entitled "Organo luminescent semiconductor nanocrystal probes for biological applications and process for making and using such probes."

Growth of nanowires having various aspect ratios, including nanowires with controlled diameters, is described in, e.g., Gudiksen et al. (2000) "Diameter-selective synthesis of semiconductor nanowires" *J. Am. Chem. Soc.* 122, 8801-8802; Cui et al. (2001) "Diameter-controlled synthesis of single-crystal silicon nanowires" *Appl. Phys. Lett.* 78, 2214-2216; Gudiksen et al. (2001) "Synthetic control of the diameter and length of single crystal semiconductor nanowires" *J. Phys. Chem. B* 105, 4062-4064; Morales et al. (1998) "A laser ablation method for the synthesis of crystalline semiconductor nanowires" *Science* 279, 208-211; Duan et al. (2000) "General synthesis of compound semiconductor nanowires" *Adv. Mater.* 12, 298-302; Cui et al. (2000) "Doping and electrical transport in silicon nanowires" *J. Phys. Chem. B* 104, 5213-5216; Peng et al. (2000) "Shape control of CdSe nanocrystals" *Nature* 404, 59-61; Puntes et al. (2001) "Colloidal nanocrystal shape and size control: The case of cobalt" *Science* 291, 2115-2117; U.S. Pat. No. 6,306,736 to Alivisatos et al. (Oct. 23, 2001) entitled "Process for forming shaped group III-V semiconductor nanocrystals, and product formed using process;" U.S. Pat. No. 6,225,198 to Alivisatos et al. (May 1, 2001) entitled "Process for forming shaped group II-VI semiconductor nanocrystals, and product formed using process"; U.S. Pat. No. 6,036,774 to Lieber et al. (Mar. 14, 2000) entitled "Method of producing metal oxide nanorods"; U.S. Pat. No. 5,897,945 to Lieber et al. (Apr. 27, 1999) entitled "Metal oxide nanorods"; U.S. Pat. No. 5,997,832 to Lieber et al. (Dec. 7, 1999) "Preparation of carbide nanorods;" Urbau et al. (2002) "Synthesis of single-crystalline perovskite nanowires composed of barium titanate and strontium titanate" *J. Am. Chem. Soc.*, 124, 1186; and Yun et al. (2002) "Ferroelectric Properties of Individual Barium Titanate Nanowires Investigated by Scanned Probe Microscopy" *Nanoletters* 2, 447.

In certain embodiments, the nanowires of the present invention are produced by growing or synthesizing these elongated structures on substrate surfaces. By way of example, published U.S. Patent Application No. US-2003-0089899-A1 discloses methods of growing uniform populations of semiconductor nanowires from gold colloids adhered to a solid substrate using vapor phase epitaxy. Greene et al. ("Low-temperature wafer scale production of ZnO nanowire arrays", L. Greene, M. Law, J. Goldberger, F. Kim, J. Johnson, Y. Zhang, R. Saykally, P. Yang, *Angew. Chem. Int. Ed.* 42, 3031-3034, 2003) discloses an alternate method of synthesizing nanowires using a solution based, lower temperature wire growth process. A variety of other methods are used to synthesize other elongated nanomaterials, including the surfactant based synthetic methods disclosed in U.S. Pat. Nos. 5,505,928, 6,225,198 and 6,306,736, for producing shorter nanomaterials, and the known methods for producing carbon nanotubes, see, e.g., US-2002/0179434 to Dai et al., as well as methods for growth of nanowires without the use of a growth substrate, see, e.g., Morales and Lieber, *Science*, V. 279, p. 208 (Jan. 9, 1998). As noted herein, any or all of these different materials may be employed in producing the nanowires for use in the invention. For some applications, a wide variety of group III-V, II-VI and group IV semiconductors may be utilized, depending upon the ultimate application of the substrate or article produced. In general, such semiconductor nanowires have been described in, e.g., US-2003-0089899-A1, incorporated herein above.

Growth of branched nanowires (e.g., nanotetrapods, tripods, bipods, and branched tetrapods) is described in, e.g., Jun et al. (2001) "Controlled synthesis of multi-armed CdS nanorod architectures using monosurfactant system" *J. Am. Chem. Soc.* 123, 5150-5151; and Manna et al. (2000) "Synthesis of Soluble and Processable Rod-, Arrow-, Teardrop-, and Tetrapod-Shaped CdSe Nanocrystals" *J. Am. Chem. Soc.* 122, 12700-12706.

Synthesis of nanoparticles is described in, e.g., U.S. Pat. No. 5,690,807 to Clark Jr. et al. (Nov. 25, 1997) entitled "Method for producing semiconductor particles"; U.S. Pat. No. 6,136,156 to El-Shall, et al. (Oct. 24, 2000) entitled "Nanoparticles of silicon oxide alloys;" U.S. Pat. No. 6,413,489 to Ying et al. (Jul. 2, 2002) entitled "Synthesis of nanometer-sized particles by reverse micelle mediated techniques;" and Liu et al. (2001) "Sol-Gel Synthesis of Free-Standing Ferroelectric Lead Zirconate Titanate Nanoparticles" *J. Am. Chem. Soc.* 123, 4344. Synthesis of nanoparticles is also described in the above citations for growth of nanocrystals, nanowires, and branched nanowires, where the resulting nanostructures have an aspect ratio less than about 1.5.

Synthesis of core-shell nanostructure heterostructures, namely nanocrystal and nanowire (e.g., nanorod) core-shell heterostructures, are described in, e.g., Peng et al. (1997) "Epitaxial growth of highly luminescent CdSe/CdS core/shell nanocrystals with photostability and electronic accessibility" *J. Am. Chem. Soc.* 119, 7019-7029; Dabbousi et al. (1997) "(CdSe)ZnS core-shell quantum dots: Synthesis and characterization of a size series of highly luminescent nanocrysallites" *J. Phys. Chem. B* 101, 9463-9475; Manna et al. (2002) "Epitaxial growth and photochemical annealing of graded CdS/ZnS shells on colloidal CdSe nanorods" *J. Am. Chem. Soc.* 124, 7136-7145; and Cao et al. (2000) "Growth and properties of semiconductor core/shell nanocrystals with InAs cores" *J. Am. Chem. Soc.* 122, 9692-9702. Similar approaches can be applied to growth of other core-shell nano structures.

Growth of nanowire heterostructures in which the different materials are distributed at different locations along the long axis of the nanowire is described in, e.g., Gudiksen et al. (2002) "Growth of nanowire superlattice structures for nanoscale photonics and electronics" *Nature* 415, 617-620; Bjork et al. (2002) "One-dimensional steeplechase for electrons realized" *Nano Letters* 2, 86-90; Wu et al. (2002) "Block-by-block growth of single-crystalline Si/SiGe superlattice nanowires" *Nano Letters* 2, 83-86; and U.S. patent application 60/370,095 (Apr. 2, 2002) to Empedocles entitled "Nanowire heterostructures for encoding information." Similar approaches can be applied to growth of other heterostructures.

As described herein, and throughout co-assigned published Patent Application Nos. 2007/0212538 and 2008/0280169, the entire contents of each of which are incorporated by reference herein, nanowire structures with multiple shells can also be fabricated, such as, for example, a conducting inner core wire (which may or may not be doped) (e.g., to impart the necessary conductivity for electron transport) and one or more outer-shell layers that provide a suitable surface for binding catalyst (and/or polymer electrolyte). For example, in one embodiment, a multi-layer or multi-walled carbon nanotube (MWNT) can be formed in which the outermost shell layer is converted to silicon carbide to provide a surface (SiC) to bind catalyst (and/or polymer electrolyte) and a conductive carbon nanotube core to impart the necessary conductivity. In alternative embodiments, the core may consist of heavily doped material such as doped silicon, and a shell of a carbide, nitride etc. material (e.g., SiC) may then be formed on the core. The use of silicon as the core material leverages the extensive experience and infrastructure known for fabricating silicon nanowires. A carbide shell, such as SiC, WC, MoC or mixed carbide (e.g. WSiC) may be formed around the core material using a controlled surface reaction. SiC, WC and MoC are known for their high conductivity and chemical stability. In addition, these materials have been shown to have catalytic properties similar to those of precious metals, such as Pt, for methanol oxidation, and therefore may provide further performance enhancements in the MEA. The precursor materials for the shell may be deposited on the core nanowire surface (e.g., silicon) by atomic layer deposition (ALD) and then converted to the carbide by high-temperature carbothermal reduction, for example.

Exemplary nanowires that can be used in the practice of the present invention include carbon-comprising nanowires, such as those disclosed in Published U.S. Patent Application Nos. 2007/0212538 and 2008/0280169. As disclosed in Published U.S. Patent Application Nos. 2007/0212538 and 2008/0280169, in suitable embodiments, the nanowires can form an interconnected nanowire network, comprising a plurality of nanowire structures, wherein carbon-based structures, in the form of nanographitic plates, attached to the various nanowire cores connect the nanowire structures.

The structure of densely packed nanowires, with or without interconnecting nanographitic plates, is also referred to throughout (and in the published applications referenced above) as a "bird's nest" structure. This arrangement takes the form of a porous structure, wherein the size of pores between the nanowires and nanographitic plates are suitably mesopores and macropores. As used herein the term "mesopores" refers to pores that are larger than micropores (micropores are defined as less than about 2 nm in diameter), but smaller than macropores (macropores are defined as greater than about 50 nm in diameter), and therefore have a pore size in the range of greater than about 30 nm to less than about 200 nm in diameter. Suitably, interconnected nanowire network 300 will be substantially free of micropores, that is, less than about 0.1% of the pores will be micropores (i.e., less than about 2 nm in diameter).

Catalyst Supports

In one embodiment, the present invention provides catalyst supports for a membrane electrode assembly of a fuel cell. The catalyst supports suitably comprise one or more silicon-carbide (SiC) nanostructures, and the SiC nanostructures have at least one metal catalyst deposited thereon. As used herein, the terms "catalyst support," or simply "support" refers to a structure onto which one or more metal catalysts are able to be deposited, disposed and/or attached, so as to provide both support and electrical connectivity to the catalyst. "Catalyst supports" includes the various SiC nanostructure catalyst supports, as well as the various composite catalyst supports, described herein. As used herein, the term "disposed" refers to any method of placing one element next to and/or adjacent (including on top of) another, and includes, spraying, layering, depositing, painting, dipping, bonding, coating, etc.

The SiC nanostructures for use in the catalyst supports can be various structures, including nanowires, nanopowder, nanorods, nanotubes, branched nanocrystals, nanotetrapods, tripods, bipods, nanocrystals, nanodots, quantum dots, nanoparticles, branched tetrapods (e.g., inorganic dendrimers), and the like. In exemplary embodiments, the catalyst supports comprise SiC nanowires or SiC nanopowder, and in further embodiments, the catalyst supports comprise composites of nanowires and SiC nanopowder, including composites of SiC nanowires and SiC nanopowder.

In exemplary embodiments, the SiC nanopowder of the catalyst supports are cross-linked by graphene sheets (and/or nanographitic plates) extending from the nanopowder. In further embodiments, the catalyst supports suitably comprise a composite of SiC nanopowder and inorganic nanowires. As described herein, any suitably nanowire can be utilized in the composite catalyst supports, including semiconductor nanowires. Suitably, the catalyst supports comprise composites of SiC nanopowder and SiC nanowires, wherein the nanopowder and the nanowires are cross-linked by graphene sheets.

As used herein, a "composite" refers to a catalyst support comprising both nanopowder and inorganic nanowires, suitably composites comprising SiC nanopowder and semiconductor nanowires, more suitably, composites comprising SiC nanopowder and SiC nanowires. In further embodiments, the present invention provides additional composite catalyst supports for a membrane electrode assembly of a fuel cell. The composite catalysts suitably comprise nanopowder and one or more inorganic nanowires, wherein at least one of the nanopowder and the nanowire have at least one metal catalyst disposed thereon. Exemplary nanopowders include, but are not limited to, WC, $SiO_2$, $TiO_2$ and combinations thereof.

The interaction between graphene sheets and nanopowder (e.g., WC, $SiO_2$, $TiO_2$ or SiC nanopowder), graphene sheets and the nanowires (e.g., SiC nanowires), and graphene sheets and the nanopowder and the nanowires, to form cross-links, is described throughout Published U.S. Patent Application Nos. 2007/0212538 and 2008/0280169, and also referred to a "graphitized" powder or nanopowder. The graphene layers grow out of the plane of the nanopowder (e.g., WC, $SiO_2$, $TiO_2$ or SiC nanopowder), attached via the a-b edges of the graphenes to the nanopowder, to each other, and suitably, to any nanowires in the supports. In embodiments, graphene layers can be interconnected as in the structure of graphite. Suitably, nanographitic plates will comprise less than about 100 graphene sheets, and more suitably, between about 2-15 graphenes. While the dimension of nanographitic plates in the a-b plane (i.e., the plane of the graphene layers) can be any size, generally they will be on the order of 10's to 100's of nanometers. Suitably the nanographitic plates will be less than about 100 nm across in the a-b plane. Graphenes and/or nanographitic plates generally extend away from the nanopowder a distance of between about 1 nm and about 500 nm, suitably on the order a few nanometers to 10's of nanometers or even to a few 100 nanometers, and link other particles of nanopowder.

Suitably, the catalyst metals disposed on the catalyst supports are electrochemical catalyst nanoparticles, including metal nanoparticles comprising one or more of Pt, Au, Pd, Ru, Re, Rh, Os, Ir, Fe, Co, Ni, Cu, Ag, V, Cr, Mo, W, and alloys or mixtures thereof. For example, the electrochemical catalyst nanoparticles suitably comprise mixtures of Pt and Ru, and are suitably Pt:Ru nanoparticles. In exemplary embodiments, the nanoparticles that are supported by the various supports of the present invention comprise Pt:Ru, including Pt:Ru nanoparticles as disclosed in U.S. Provisional Patent Application No. 61/108,304, the disclosure of which is incorporated by reference herein in its entirety.

As used herein, a "nanoparticle" refers to a particle, crystal, sphere, or other shaped structure having at least one region or characteristic dimension with a dimension of less than about 500 nm, suitably less than about 200 nm, less than about 100 nm, less than about 50 nm, less than about 20 nm, or less than about 10 nm. Suitably, all of the dimensions of the electrochemical catalyst nanoparticles utilized in the present invention are less than about 50 nm, and suitably have a size of about 1 nm to about 30 nm, or about 1 nm to about 20 nm, about 1 nm to about 10 nm, about 1 nm to about 9 nm, about 1 nm to about 8 nm, about 1 nm to about 7 nm, about 1 nm to about 6 nm, about 1 nm to about 5 nm, about 1 nm to about 4 nm, about 1 nm to about 3 nm, or about 1 nm to about 2 nm, for example, about 1 nm, about 2 nm, about 3 nm, about 4 nm, about 5 nm, about 6 nm, about 7 nm, about 8 nm, about 9 nm, or about 10 nm.

Exemplary nanowires for use in the catalyst supports include those disclosed herein and in Published U.S. Patent Application Nos. 2007/0212538 and 2008/0280169. In exemplary embodiments, the inorganic nanowires of the catalyst supports comprise $RuO_2$, SiC, GaN, $TiO_2$, $SnO_2$, $WC_x$, $MoC_x$, ZrC, $WN_x$, or $MoN_x$ nanowires, wherein x is a positive integer. Suitably, the nanowires are carbon-comprising nanowires, such as SiC nanowires, including the graphene cross-linked bird nest structures described herein and in Published U.S. Patent Application Nos. 2007/0212538 and 2008/0280169.

Suitably, the catalyst supports of the present invention, including nanopowder (e.g., WC, $SiO_2$, $TiO_2$ or SiC nanopowder), nanowire (including SiC nanowire), and composite nanopowder and nanowire supports further comprise a proton conducting polymer, e.g., an ionomer such as NAFION®, in contact with the nanopowder and/or nanowires. Such catalysts supports can be incorporated in fuel cells, such as hydrogen fuel cells and DMFCs. Large pores present between the nanopowders and nanowires are reduced by the cross-linking graphene layers that block the pores, thereby increasing the surface area for the deposition of precious metal (e.g., Pt and/or Ru) and uniformly distributing electrolyte ionomer. In addition, the cross-linked nanopowders, nanowires and nanopowder/nanowire composites provide an improved interface between catalyst layers and the polymer electrolyte membrane of the fuel cell, thereby reducing delamination of the catalyst layers. Ball-milling, grinding, or other mechanical methods can be utilized to control the size of the nanopowder, nanowire and composite nanopowder/nanowire supports by machining the supports after graphitization and cross-linking of the components.

The catalyst supports comprising composites of a network of inorganic nanowires (e.g., SiC nanowires) and nanopowder (e.g., WC, $SiO_2$, $TiO_2$ or SiC nanopowder) (nanopowder-nanowire composites, or nanowire-nanopowder composites) of the present invention provide improved performance in fuel cells, including hydrogen fuel cells and DMFCs, based on nanopowder being trapped in the spaces between the nanowire structures, thus reducing or eliminating $CO_2$ and/or water trapping. In addition, graphitizing the nanopowder, nanowires and nanopowder/nanowire composites increases the conductivity of the catalyst supports.

The catalyst supports of the present invention can be used in various fuel cell applications and configurations, for example, as fuel cell cathodes. In exemplary embodiments, such cathodes comprise a SiC nanostructure, such as a SiC nanowire, SiC nanopowder, or SiC nanopowder/nanowire (e.g., SiC nanowire) composite, and Pt nanoparticles, wherein the nanoparticles have a diameter from about 1 nm to about 10 nm, about 1 to 3 nm, or about 3 nm to about 5 nm. Additional catalyst supports include composite catalyst supports comprising nanopowder (e.g., WC, $SiO_2$, $TiO_2$ or SiC nanopowder) and inorganic nanowires. The catalyst supports can also be used as fuel cell anodes, for example, by using catalytic Pt nanoparticles on the order of about 1 nm to about 10 nm, or more suitably, from about 1 nm to about 5 nm in diameter.

The present invention also provides membrane electrode assemblies comprising the SiC nanostructure catalyst supports of the present invention (e.g., catalyst supports comprising SiC nanopowder, SiC nanowires, or composites of SiC nanopowder and nanowires, including SiC nanowires), or the composite catalyst supports of the present invention. As described throughout, suitably the catalysts on the supports are electrochemical catalyst nanoparticles comprising one or more metals. Exemplary nanoparticles include Pt nanoparticles. The membrane electrode assemblies of the present invention can be utilized as a component in a fuel cell, including methanol fuel cells, formic acid fuel cells, ethanol fuel cells, hydrogen fuel cells or ethylene glycol fuel cells.

The present invention also provides membrane electrode assemblies (MEA) comprising the catalyst supports disclosed herein as components of cathode catalysts and/or anode catalysts, and also a membrane (e.g., a NAFION® membrane, DuPont, Wilmington, Del.). Such MEAs can be constructed using well known methods in the art, for example as set forth in U.S. Pat. Nos. 6,933,033; 6,926,985; and 6,875,537, the disclosures of each of which are incorporated herein by reference in their entireties. In exemplary embodiments, the membrane will be disposed on one side with a cathode catalyst and on the other side an anode catalyst. Fuel cells comprising such MEAs, as well as gas diffusion layers (e.g., carbon fiber cloth), bipolar plates and end plates (e.g., machined graphite or molded conducting polymer composites) can also be constructed, as is well known in the art. Exemplary fuel cells that can be constructed using the catalyst supports disclosed herein include proton exchange membrane fuel cells (PEMFC) and direct methanol fuel cells (DMFC). The catalyst supports can also be used to generate anodes and cathodes, for example for use in lithium batteries and electrochemical capacitors. The components and construction of such batteries and capacitors is well known in the art.

In one embodiment of the invention, the nanowire portion of the anode (and/or cathode) electrode may be synthesized on a growth substrate, and then transferred and incorporated into the membrane electrode assembly structure of the fuel cell, such as described in Published U.S. Patent Application Nos. 2007/0212538 and 2008/0280169.

Following growth of the nanowires, the nanowires are suitably harvested from their synthesis location. The free-standing nanowires can then be introduced into or deposited upon the relevant surface of the fuel cell component such as the gas diffusion layer(s) or proton exchange membrane, for example, by spray/brush painting, solution coating, casting, electrolytic deposition, filtering a fluid suspension of the nanowires, and combinations thereof. Suitably, catalyst metals, such as electrochemical catalyst nanoparticles, are then introduced. Deposition may simply involve immersing the component of interest (e.g., one or more of the gas diffusion layers or the proton exchange membrane) into a suspension of such nanowires, or may additionally involve pre-treating all or portions of the component to functionalize the surface or surface portions for wire attachment. As described in Published U.S. Patent Application Nos. 2007/0212538 and 2008/0280169, the nanowires may also be introduced into a solution (e.g., methanol, ethylene glycol or water), filtered (e.g., vacuum filtered over a polyvinylidene fluoride (PVDF) membrane) to give them a dense, intertwined mat or "bird's nest structure," removed from the filter after drying and washing, and then heat treated (e.g., annealed) at high temperatures. The resulting porous sheet of nanowires (whether interconnected with nanographitic plates or not) can then be incorporated into the membrane electrode assembly of the fuel cell. A variety of other deposition methods, e.g., as described in U.S. Patent Application Publication No. 2005/0066883, published Mar. 31, 2005, and U.S. Pat. No. 6,962,823, the full disclosures of which are incorporated herein by reference in their entirety for all purposes, can also be used. The nanowires may also be grown directly on one or more of the fuel cell components such as one or more of the bipolar plates and/or proton exchange membranes.

Typically, a fuel cell generally comprises an anode electrode, a cathode electrode, and a proton exchange membrane (PEM). The assembly of these three components is generally referred to as a membrane electrode assembly (MEA). As described in Published U.S. Patent Application Nos. 2007/0212538 and 2008/0280169, nanowires can be used to replace traditional carbon particles in PEMFCs as the catalyst support and electron conducting medium to make MEAs. Because the generation of surface functional groups on SiC nanostructure catalyst supports and nanowires, e.g., nanowires such as SiC or GaN, or the nanopowder/nanowire composite catalysts described herein, is relatively straightforward, catalyst nanoparticles such as Pt and/or Pt:Ru nanoparticles (as well as a proton conducting polymer (e.g., NAFION®)), can be facilely deposited on the catalyst supports, e.g., without agglomeration of the particles. Each catalyst particle is then directly connected to the anode (and cathode). The multiple electrical connectivity of the interconnected nanowires secures the electronic route from Pt to the electron conducting layer.

An exemplary fuel cell comprising the catalyst supports of the present invention suitably includes an anode bipolar electrode plate, a cathode bipolar electrode plate, a proton exchange membrane, an anode electrode, a cathode electrode, and catalyst supports positioned between both the anode electrode and cathode electrode on one side, and the proton exchange membrane on the other side of the fuel cell. Generally, a plurality of fuel cells or MEAs can be combined to form a fuel cell stack. The cells within the stacks are connected in series by virtue of the bipolar plates, such that the voltages of the individual fuel cells are additive.

Suitably, the catalyst supports disclosed herein are dispersed in a polymer electrolyte material that disperses on the surface of nanostructures (e.g., nanopowder and/or nanowires) to provide sufficient contact points for proton (e.g., $H^+$) transport. Polymer electrolytes can be made from a variety of polymers including, for example, polyethylene oxide, poly (ethylene succinate), poly(β-propiolactone), and sulfonated fluoropolymers such as NAFION® (commercially available from DuPont Chemicals, Wilmington). A suitable cation exchange membrane is described in U.S. Pat. No. 5,399,184, for example, the disclosure of which is incorporated herein by reference. Alternatively, the proton conductive membrane can be an expanded membrane with a porous microstructure where an ion exchange material impregnates the membrane, effectively filling the interior volume of the membrane. U.S. Pat. No. 5,635,041, incorporated herein by reference, describes such a membrane formed from expanded polytetrafluoroethylene (PTFE). The expanded PTFE membrane has a microstructure of nodes interconnected by fibrils. Similar structures are described in U.S. Pat. No. 4,849,311, the disclosure of which is incorporated herein by reference. In additional embodiments, proton shuttle molecules can be attached to the nanowires. For example, short hydrocarbon chains comprising —$SO_3H$ groups (e.g., 2-6 carbons long) can be grafted to the nanowires, as described in Published U.S. Patent Application Nos. 2007/0212538 and 2008/0280169. Use of such proton shuttle molecules can reduce the amount of NAFION® or other ionomer required, thereby increasing the available surface area of the catalytic nanoparticles.

The nanowires of the catalyst supports may optionally be fused or cross-linked at the points where the various wires contact each other, to create a more stable, robust and potentially rigid membrane electrode assembly. The nanowires may also include surface chemical groups that may form chemical cross-links in order to cross-link the underlying nanowires. For example, the nanowires may be cross-linked or fused together by depositing a small amount of conducting or semiconducting material at their cross-points. For example, SiC nanowires (or, e.g., carbon nanotube nanowires having a SiC shell layer) can be cross-linked by depositing amorphous or polycrystalline SiC at their cross-points.

The catalysts, including electrochemical catalyst nanoparticles, may be deposited or otherwise associated with the catalyst supports of the present invention as a thin film on the nanostructures (e.g., less than about 10 angstroms in thickness) (or a series of catalyst particles) using a variety of catalyst deposition techniques including, for example, chemical vapor deposition, electrochemical deposition (e.g., electroplating or electroless chemical plating), physical vapor deposition, solution impregnation and precipitation, colloid particle absorption and deposition, atomic layer deposition, and combinations thereof. The amount of the catalyst metal coated by the methods described herein is preferably in the range of about 0.5%-85% by weight, suitably about 10%-85%, about 20%-80%, more suitably about 20%-50% by weight, for example about 30%-45% by weight, based on the total amount of catalyst metal and catalyst support.

In further embodiments, the electrochemical catalyst nanoparticles can be deposited on the catalyst support surfaces as a plurality of nanometer-sized metallic catalyst particles (e.g., between about 1 and 50 nm in diameter, e.g., less than about 10 nm in diameter, e.g., between about 1 and 5 nm or about 1 and 3 nm in diameter), in solution. By derivatizing the catalyst support external surface with one or more functional linker moieties (e.g., a chemically reactive group) such as one or more carboxylic acid groups, nitric acid groups, hydroxyl groups, amine groups, sulfonic acid groups, and the like, the nanoparticles are able to more easily bind to the surface of the supports. The electrochemical catalyst nanoparticles (or film) can be attached to the supports either uniformly or non-uniformly. The electrochemical catalyst nanoparticles can be spherical, semi-spherical or non-spherical. The electrochemical catalyst nanoparticles can form islands on the surface of the supports or can form a continuous coating on the surface of the supports such as in a core-shell arrangement, for example as stripes or rings along the length of a nanowire, etc. The electrochemical catalyst nanoparticles can be attached to the catalyst support surface before or after the support is incorporated/deposited into the MEA of the fuel cell. In one embodiment, the electrochemical catalyst nanoparticles can be selected from a population of catalyst particles having a uniform size distribution of less than about 50%, for example, less than about 30%, for example, less than about 20%.

When a chemical linker molecule is used to bind the electrochemical catalyst nanoparticles to the catalyst support, the chemical linker can be selected to promote electrical connection between the electrochemical catalyst nanoparticles and the support, or the chemical linker can be subsequently removed to promote electrical connection. For example, heat, vacuum, chemical agents or a combination thereof, can optionally be applied to the supports to cause the linker molecule to be removed to place the catalysts in direct physical contact with the supports to form a solid electrical connection between the catalyst particles and the support. The structure can also be heated to anneal the interface between the catalysts and the supports in order to improve the electrical contact therebetween. Appropriate temperatures and heating conditions are well known to those of skill in the art.

Electrochemical catalyst nanoparticles for use in the present invention can be prepared using the various methods disclosed in Published U.S. Patent Application Nos. 2007/0212538 and 2008/0280169. Suitably, one or more catalyst supports are dispersed in a solution. One or more catalyst metals are then added to the solution, and the solution is refluxed, whereby the catalyst metals become associated with the supports. Any suitable solution can be used for dispersion of the nanowires and then subsequent refluxing. Exemplary solutions include organic solvents such as ethylene glycol, as well as alcohols and aqueous-based solutions.

As discussed throughout, in exemplary embodiments, the supports are derivatized with at least a first functional group which binds the catalyst metal, for example, a nitric acid, a carboxylic acid group, a hydroxyl group, an amine group, and a sulfonic acid group. Following refluxing the support solution, the supported electrochemical nanoparticles are suitably filtered, and then dried.

Following catalyst deposition, a proton conducting polymer such as NAFION® may optionally be deposited on the catalyst supports between catalyst particle sites, for example, by functionalizing the surface of the support with a second functional group (different from the catalyst functional group, when used) that preferentially binds the electrolyte or which promotes consistent and/or controlled wetting. The polymer can either be a continuous or discontinuous film. For example, the polymer electrolyte can be uniformly wetted on the surface of the support, or can form point-contacts along the support, for example, along the length of the nanowires. The catalyst supports may be functionalized with a sulfonated hydrocarbon molecule, a fluorocarbon molecule, a short chain polymer of both types of molecules, or a branched hydrocarbon chain which may be attached to the support surface via silane chemistry. Those of skill in the art will be familiar with numerous functionalizations and functionalization techniques which are optionally used herein (e.g., similar to those used in construction of separation columns, bioassays, etc.). Alternatively, instead of binding ionomer to the supports through a chemical binding moiety, the supports may be directly functionalized to make them proton conductive. For example, the supports may be functionalized with a surface coating such as a perfluorinated sulfonated hydrocarbon using well-known functionalization chemistries.

For example, details regarding relevant moiety and other chemistries, as well as methods for construction/use of such, can be found, e.g., in Hermanson Bioconjugate Techniques Academic Press (1996), Kirk-Othmer Concise Encyclopedia of Chemical Technology (1999) Fourth Edition by Grayson et al. (ed.) John Wiley & Sons, Inc., New York and in Kirk-Othmer Encyclopedia of Chemical Technology Fourth Edition (1998 and 2000) by Grayson et al. (ed.) Wiley Interscience (print edition)/John Wiley & Sons, Inc. (e-format). Further relevant information can be found in CRC Handbook of Chemistry and Physics (2003) 83rd edition by CRC Press. Details on conductive and other coatings, which can also be incorporated onto the nanowire surface by plasma methods and the like can be found in H. S. Nalwa (ed.), Handbook of Organic Conductive Molecules and Polymers, John Wiley & Sons 1997. See also, "ORGANIC SPECIES THAT FACILITATE CHARGE TRANSFER TO/FROM NANOCRYSTALS," U.S. Pat. No. 6,949,206. Details regarding organic chemistry, relevant for, e.g., coupling of additional moieties to a functionalized surface can be found, e.g., in Greene (1981) Protective Groups in Organic Synthesis, John Wiley and Sons, New York, as well as in Schmidt (1996) Organic Chemistry Mosby, St Louis, Mo., and March's Advanced Organic Chemistry Reactions, Mechanisms and Structure, Fifth Edition (2000) Smith and March, Wiley Interscience New York ISBN 0-471-58589-0, and U.S. Patent Publication No. 20050181195, published Aug. 18, 2005. Those of skill in the art will be familiar with many other related references and techniques amenable for functionalization of surfaces herein. The disclosure of each of the foregoing citations is hereby incorporated herein by reference.

By increasing the density of sulfonic groups on the ionomer utilized in the MEAs and varying the ionomer side chains, the characteristics, including surface groups and equilibrant weight of the ionomer (e.g., NAFION®) can be matched to the supported electrochemical catalysts. This allows for an increase in the ratio of catalyst in contact with the electrolyte ionomer. For example, a NAFION® ionomer having an equilibrant weight (EW) of 1000, or a shorter side chain ionomer (e.g., HYFLON®) with a lower EW (e.g., 850), can be utilized with the supported electrochemical catalysts in direct methanol fuel cells.

The polymer electrolyte coating may be directly linked to the surface of the support, e.g., through silane groups, or may be coupled via linker binding groups or other appropriate chemical reactive groups to participate in linkage chemistries (derivitization) with linking agents such as, e.g., substituted silanes, diacetylenes, acrylates, acrylamides, vinyl, styryls, silicon oxide, boron oxide, phosphorus oxide, N-(3-aminopropyl)-3-mercapto-benzamide, 3-aminopropyl-trimethoxysilane, 3-mercaptopropyl-trimethoxysilane, 3-maleimidopropyl-trimethoxysilane, 3-hydrazidopropyl-trimethoxysilane, trichloro-perfluoro octyl silane, hydroxysuccinimides, maleimides, haloacetyls, hydrazines, ethyldiethylamino propylcarbodiimide, and/or the like. Other surface functional chemistries can be used such as those that would be known to one or ordinary skill in the art.

In addition, a solubilized perfluorosulfonate ionomer (e.g., NAFION®) may be placed into the space between nanostructures, nanowires, nanopowder, or in the composites. The support structure, when not produced in situ on one of the bipolar plates and/or proton exchange membrane, may then be placed between bipolar plates on either side of a proton exchange membrane, and the assembly hot pressed to form a complete membrane-electrode assembly fuel cell according to the present invention. The pressing temperature is determined such that the proton exchange membrane is softened in that temperature range, for example, to 125° Celsius for NAFION®. The pressure level is about 200 kgf/cm$^2$.

In order to efficiently distribute fuel/oxygen to the surface of the anode/cathode electrodes a gas diffusion layer is typically needed in conventional fuel cells between the anode electrode and bipolar plate on one side, and the cathode electrode and bipolar plate on the other side of the fuel cell. Typically, a carbon fiber cloth is used as the gas diffusion layer. With the catalyst supports of the present invention, this gas diffusion layer can be eliminated due to the superior structure of the nanowire-based electrodes.

Membrane Electrode Assemblies and Fuel Cells Comprising Catalyst Supports

As described throughout, present invention also provides membrane electrode assemblies (MEAs) comprising the catalyst supports, as well as fuel cells comprising the MEAs. Exemplary methods of preparing MEAs are disclosed in Published U.S. Patent Application Nos. 2007/0212538 and 2008/0280169. In suitable embodiments, an optional gas diffusion layer is provided, such as a TEFLON® (DuPont) treated surface, for example TEFLON® treated carbon paper or woven cloth (e.g., carbon cloth). Catalyst supports are then disposed adjacent the optional gas diffusion layer. Disposing components adjacent one another, includes, layering, applying, spraying, coating, spreading, or any other form of application of the various components.

A membrane layer is then disposed adjacent the catalyst supports. Suitably, membrane layer comprises a proton conducting polymer, such as NAFION® or other sulfonated polymer. A second catalyst support is then disposed adjacent the membrane layer. In exemplary embodiments, the proton conducing polymer can comprise an interfacial layer, as disclosed in U.S. Provisional Patent Application No. 61/108,301, the disclosure of which is incorporated by reference herein in its entirety.

Additional methods of forming MEAs and fuel cells comprising the catalyst supports are found throughout Published U.S. Patent Application Nos. 2007/0212538 and 2008/0280169. Methods for disposing the various layers of MEAs include layering, brushing, etc., and in suitable embodiments, spraying the various layers. Spraying a solution of SiC nanostructure-catalyst supports (e.g., SiC nanopowder, SiC nanowire, or composite SiC nanopowder/nanowire (SiC nanowire), or composite catalyst supports (nanopowder and nanowire composites), allows for the control of the thickness and density of the layer. In addition, one or more ionomers can be provided in the solution to be sprayed, thereby allowing for spraying of a solution of catalyst supports and one or more ionomers. Exemplary ionomers are described throughout and include sulphonated polymers (e.g., NAFION®) and the like.

Membrane electrode assemblies prepared by the methods of the present invention can be utilized in preparation of various fuel cell electrodes, for example, in fuel cell electrode stacks. Exemplary fuel cells include oxidative fuel cells, such as methanol fuel cells, formic acid fuel cells, ethanol fuel cells, hydrogen fuel cells, ethylene glycol fuel cells and other fuel cells known those of ordinary skill in the art.

Any number of MEA layers up to an $n^{th}$, or final desired MEA layer, can be prepared in the fuel cell electrode stacks of the present invention. Suitably, the ends of a fuel cell electrode stack comprise end plates and bipolar plates. Typically, bipolar plates and end plates are highly electrically conductive and can be made from graphite, metals, conductive polymers, and alloys and composites thereof. Materials such as stainless steel, aluminum alloys, carbon and composites, with or without coatings, are good viable options for bipolar end plates in fuel cells. Bipolar plates and end plates can also be formed from composite materials comprising highly-conductive or semiconducting nanowires incorporated in the composite structure (e.g., metal, conductive polymer etc.). While bipolar plates suitably comprise channels and/or groves on both surfaces, end plates typically only comprise channels and/or groves on the surface that is contact with the fuel cell components (i.e., the internal surface), while the external surface does not comprise such channels or groves. Suitably, the various fuel cell components are repeatedly disposed/layered/stacked until the final, desired fuel cell stack is achieved.

The final fuel cell stack can then be clamped together, and fuel impregnated with a suitable electrolyte, for example, an ethylene glycol solution, methanol, formic acid, formaldehyde or small alcohols. Addition of further components as disclosed throughout and known in the art can then be added to yield a working fuel cell.

As the catalyst supports of the present invention provide for increased catalytic activity relative to other catalysts/catalyst supports without the disclosed characteristics, the amount of catalyst particles that are required for a particular application can be reduced, thereby allowing for a reduced material cost and thus reduced cost for fuel cell production. In addition, utilizing less catalyst in the electrodes allows for the production of thinner electrodes, and thus reduced resistance of the electrodes.

It will be readily apparent to one of ordinary skill in the relevant arts that other suitable modifications and adaptations to the methods and applications described herein can be made without departing from the scope of the invention or any embodiment thereof. Having now described the present invention in detail, the same will be more clearly understood by reference to the following examples, which are included herewith for purposes of illustration only and are not intended to be limiting of the invention.

EXAMPLES

Example 1

Preparation and Characterization of Graphitized SiC Nanostructures

Silicon Carbide (SiC) nanopowder was purchased from Sigma-Aldrich and used as received. The nanopowder was graphitized under the following reaction conditions:

The nanopowder was exposed to reaction gas at 1300° C., 7 pounds per square inch (psi) in a furnace chamber.
The reaction gas consisted of:
Ar, at a flow rate of 900 standard cubic centimeters per minute (sccm);
$H_2$ at a flow rate of 180 sccm; and
5% $CH_4$/Ar at a flow rate of 300 sccm.
The reaction was carried out for about 1 hour. The furnace was then cooled, the sample removed and mixed uniformly, and then the reaction was repeated as above.

FIGS. 1A-1D show transmission electron micrographs (TEMs) of the SiC nanopowder before graphitization (various magnifications shown), and FIGS. 1E-1H, are TEM images of the graphitized SiC nanopowders following the reaction set forth above (again, various magnifications shown). The average nanopowder size is less than 50 nm. Graphene barbs 102 can be seen in FIGS. 1E-1H. The dimension of the barbs is from a few nanometers to about 20 nanometers.

The resulting graphitized SiC nanopowders were used as catalyst supports, where the SiC nanopowder had about 12 weight % (wt %) graphene bonded on surface of the SiC nanopowder. Pt nanoparticles were then deposited on the graphitized SiC nanopowder at about 30% Pt/graphitized SiC support. The resulting catalyst/supports were then utilized in a membrane electrode assembly (MEA). The cathode loading was 0.15 mg Pt/cm² and the anode loading was 0.05 mg Pt/cm².

Figure 1A:
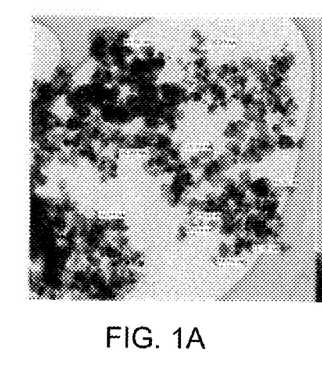
FIGS. 1A-1D show transmission electron micrograph (TEM) images of SiC nanopowder.
Figure 1B:
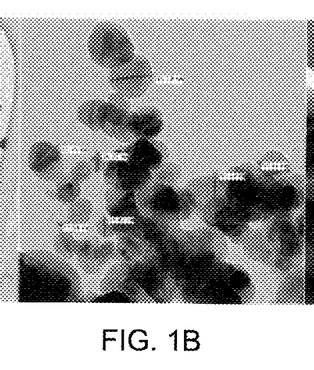
Figures 1C, 1D:
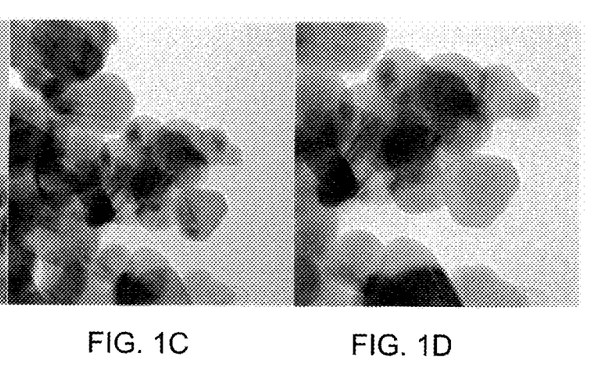
Figure 1E:
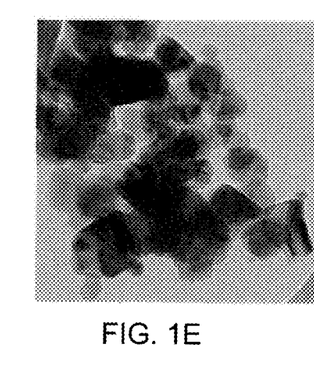
FIGS. 1E-1H show transmission electron micrograph (TEM) images of graphitized SiC nanopowder.
Figure 1F:
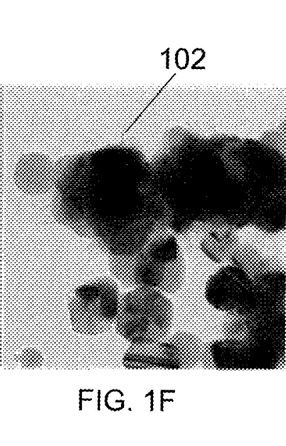
Figure 1G:
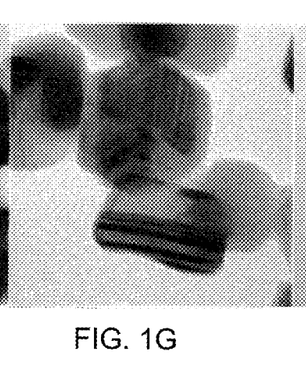
Figure 1H:
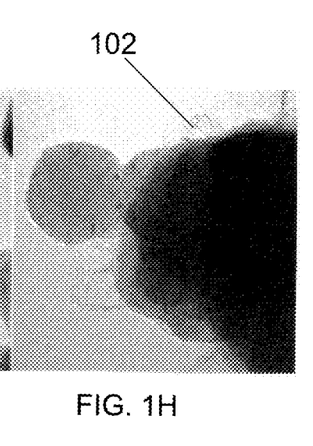
Figure 2:
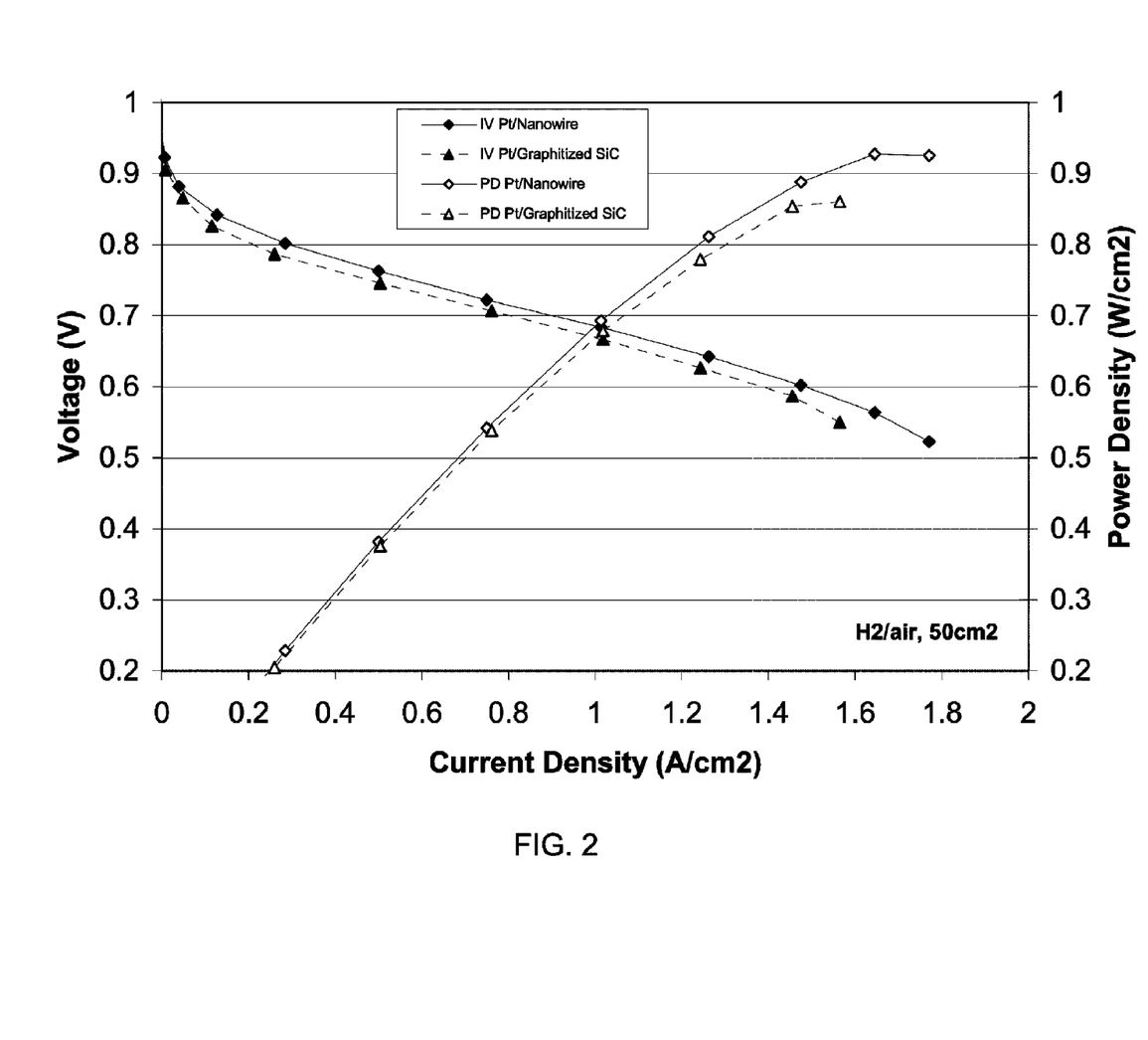
FIG. 2 shows the hydrogen fuel cell performance of graphitized SiC catalyst supports in accordance with one embodiment of the present invention.

As demonstrated in FIG. 2, showing Voltage (V) and Power Density (W/cm$^2$) versus Current Density (A/cm$^2$), the hydrogen/air fuel cell polarization behavior for the MEA using the SiC graphitized nanopowders was just slightly lower than that for an MEA prepared using Pt/Si nanowire catalysts under identical conditions. The conditions of the polarization studies were H$_2$ (stoichiometry 2) humidified at 90° C., Air (stoichiometry 3) humidified at 85° C., cell temperature 80° C., and utilized a HYFLON® E79-03s membrane.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

All publications, patents and patent applications mentioned in this specification are indicative of the level of skill of those skilled in the art to which this invention pertains, and are herein incorporated by reference to the same extent as if each individual publication, patent or patent application was specifically and individually indicated to be incorporated by reference.

What is claimed is:

1. A catalyst support for a membrane electrode assembly of a fuel cell, comprising one or more SiC nanostructures, wherein the SiC nanostructures have at least one metal catalyst disposed thereon, wherein the SiC nanostructures comprise SiC nanopowder, wherein the SiC nanopowder is cross-linked by graphene sheets.

2. The catalyst support of claim 1, further comprising one or more nanowires comprising RuO$_2$, SiC, GaN, TiO$_2$, SnO$_2$, WC$_x$, MoC$_x$, ZrC, WN$_x$, or MoN$_x$.

3. The catalyst support of claim 1, wherein the catalyst metal comprises one or more of Pt, Au, Pd, Ru, Re, Rh, Os, Ir, Fe, Co, Ni, Cu, Ag, V, Cr, Mo, W, and alloys or mixtures thereof.

4. The catalyst support of claim 1, wherein the catalyst metal comprises nanoparticles having a diameter less than about 10 nm.

5. The catalyst support of claim 1, further comprising a proton conducting polymer in contact with the SiC nanopowder.

6. The catalyst support of claim 1, wherein the membrane electrode assembly is a component in a hydrogen fuel cell or a direct methanol fuel cell (DMFC).

7. The catalyst support of claim 1, wherein the catalyst metal comprises PtRu nanoparticles.

8. A catalyst support for a membrane electrode assembly of a fuel cell, comprising one or more SiC nanostructures, wherein the SiC nanostructures have at least one metal catalyst disposed thereon, wherein the SiC nanostructures comprise a composite of SiC nanopowder and SiC nanowires, and wherein the nanopowder and the nanowires are cross-linked by graphene sheets.

9. A catalyst support for a membrane electrode assembly of a fuel cell comprising a composite of SiC nanopowder and inorganic nanowires, wherein at least one of the SiC nanopowder and the inorganic nanowires have at least one metal catalyst disposed thereon, and wherein the SiC nanopowder and the inorganic nanowires are cross-linked by graphene sheets.

10. The catalyst support of claim 9, wherein the nanowires comprise RuO$_2$, SiC, GaN, TiO$_2$, SnO$_2$, WC$_x$, MoC$_x$, ZrC, WN$_x$, or MoN$_x$ nanowires.

11. The catalyst support of claim 9, wherein the catalyst metal comprises one or more of Pt, Au, Pd, Ru, Re, Rh, as, Ir, Fe, Co, Ni, Cu, Ag, V, Cr, Mo, W, and alloys or mixtures thereof.

12. The catalyst support of claim 9, wherein the catalyst metal comprises nanoparticles having a diameter less than about 10 nm.

13. The catalyst support of claim 9, further comprising a proton conducting polymer in contact with the SiC nanopowder and nanowires.

14. The catalyst support of claim 9, wherein the membrane electrode assembly is a component in a hydrogen fuel cell or a direct methanol fuel cell (DMFC).

15. The catalyst support of claim 9, wherein the catalyst metal comprises Pt nanoparticles.

* * * * *